June 25, 1963 H. L. JOHNSTON ET AL 3,095,220

ZERO LOAD PUMP FLANGE CONNECTION

Filed Feb. 16, 1959 2 Sheets-Sheet 1

INVENTORS.
HERRICK L. JOHNSTON.
JAMES G. PIERCE.
BY Charles M. Hogan
ATTORNEY.

ZERO LOAD PUMP FLANGE CONNECTION

Filed Feb. 16, 1959 2 Sheets-Sheet 2

INVENTORS.
HERRICK L. JOHNSTON.
JAMES G. PIERCE.
BY Charles M. Hogan
ATTORNEY.

United States Patent Office 3,095,220
Patented June 25, 1963

1

3,095,220
ZERO LOAD PUMP FLANGE CONNECTION
Herrick L. Johnston and James G. Pierce, Columbus, Ohio, assignors to Herrick L. Johnston, Inc., Columbus, Ohio, a corporation of Ohio
Filed Feb. 16, 1959, Ser. No. 793,481
6 Claims. (Cl. 285—114)

The present invention is directed generally to arrangements for transferring cryogenic liquids and specifically to an improved structure in which such transfer is accomplished without imposing destructive stresses due to contraction, on either the input support for the transfer line or the output support thereof.

The invention further specifically provides an improved transfer structure, featuring an essentially zero load pump flange connection, in which pressures normal to the input support, which pressures would otherwise be destructive of such support (i.e. the pump), are relieved and dissipated at the output end. This zero load connection is of equal utility when the input end is supported by a tank or any other apparatus to be relieved of strain.

A principal object of the present invention is to provide an arrangement for the transfer of cryogenic liquids which is of such a nature that the stresses due to thermal contraction are prevented from imposing breaking stresses on the terminals of the line.

Another object of the present invention is to provide such a transfer line in which pressures exerting forces in a direction axially thereof are prevented from imposing breaking stresses at the input terminal.

Another object of the invention is to accomplish the aforementioned objectives while maintaining the advantages of vacuum insulation.

A specific object of the invention is to provide an arrangement for transferring vacuum-jacketed cryogenic liquids at high pressures and low temperatures, from a pump housing to a fixed output point, without imposing breaking strains on the housing of such pump.

Another object of the invention is to provide a strain-free delivery line for a pump.

Figures 1, 2, 3, 4:
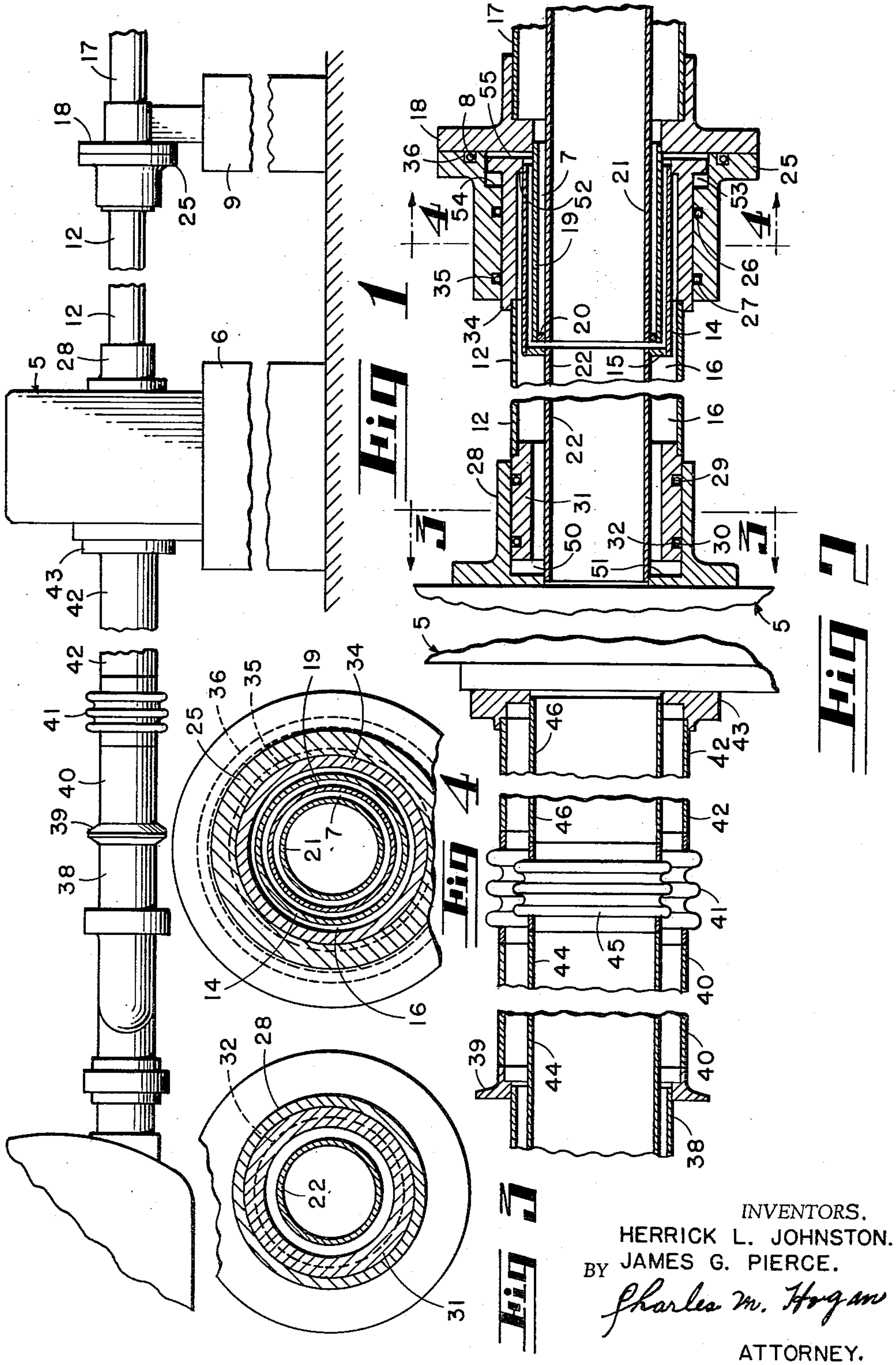
Figure 7:
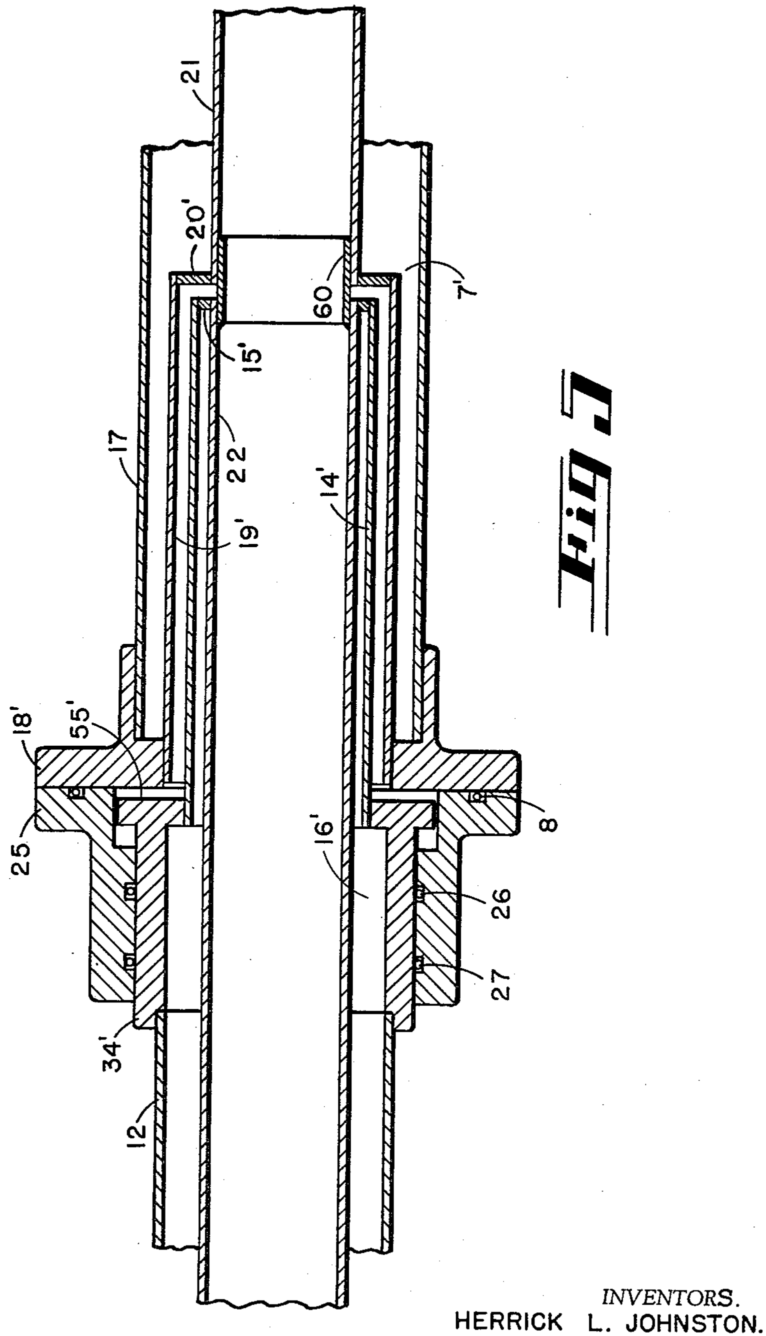

For a better understanding of the present invention, together with other objects, advantages and capabilities thereof, reference is made to the following description of the accompanying drawings, in which:

FIG. 1 is an elevational view showing a system employing a transfer line having a zero load pump flange input connection and output coupling in accordance with the invention, in conjunction with a pump 5, which delivers the cryogenic liquid to such line for passage to a fixed output framework comprising the elements 18 and 9;

FIG. 2 is a central axial section through the FIG. 1 structure showing our novel anti-strain, pressure-relieving transfer line including a preferred embodiment of zero load pump flange input connection and output coupling in accordance with the invention; and FIGS. 3—3 and 4—4 are sectional views taken along the section lines 3—3 and 4—4 of FIG. 2, respectively, in each case looking in the directions indicated by the arrows in FIG. 2; and FIG. 5 is an alternative embodiment of output coupling arrangement suitable for use in the FIGS. 1–4 system, in lieu of the output coupling there employed.

In accordance with the invention, there is provided:

Apparatus (as shown in FIG. 2) for transferring a cryogenic liquid from liquid-supply equipment 5 to a remote fixed location (as at 18) without imposing breaking strains on said equipment, comprising:

First and second double-walled transfer sections each having an inner liquid-transfer pipe 22 or 21 and an

2 outer jacket 12 or 17, said sections defining vacuum chambers 16, 7,

One of said sections being formed with an extension 14 having an enlarged interior bore and the other of said sections being formed with a complementary extension 19 having a reduced outer diameter, said extensions telescoping to form a joint, First and second mounting couplers 28 and 25 rigidly secured to said equipment and to said fixed location, respectively, First and second complementary couplers 31 and 34 secured to the outer jacket of the first transfer section and gas-tightly but slidably fitted to the first and second mounting couplers 28 and 25 respectively, The inner pipe 22 of the first transfer section being rigidly secured to said equipment 5 at one end and the first complementary coupler 31 being axially displaceable relative to that inner pipe 22 so that thermal contraction of said equipment 5 and said inner pipe 22 and its associated extension 14 axially displaces the complementary couplers 31, 34 relative to their respective mounting couplers 28, 25 but imposes no strain on the equipment, And a flange member 18 at said fixed location formed to secure together the jacket 17 and extension 19 of the second transfer section and to abut against the second mounting coupler 25, Said second mounting 25 and second complementary couplers 34 being formed with surfaces which engage (at 54) to prevent further displacement of the second complementary coupler 34 after a predetermined amount of contraction has occurred, Whereby axial forces caused by pressures and directed toward said equipment (as at the right hand face of 15 and 55) are neutralized by pickup at said surfaces and dissipation at said fixed location (through 25, 18 and 9).

Referring first to FIG. 1, there is shown a liquid supply equipment or centrifugal pump 5 mounted on a suitable foundation 6 which may be made of concrete, for example. Under operating conditions the cryogenic liquid output of this pump is delivered, at low temperature and high pressure, through a vacuum-jacketed pipe section (the jacket being indicated at 12) to another pipe (the jacket of which is shown at 17). Elements 22 and 12 are the principal elements of the first transfer section. Elements 21 and 17 are the principal elements of the second transfer section. The vacuum-containing jacket 17 is secured to a flange 18, which in turn is rigidly secured by appropriate means to a suitable concrete foundation 9. Flange 18 is located at a remote fixed location relative to the input end of the first transfer line. Attention is invited to the fact that in cooling down a transfer line between pump 5 and a rigid fixed location or frame (such as that constituted by flange 18) at the low temperatures here involved, which may be on the order of —420 degrees F., the thermal contraction of a vacuum-jacketed line rigidly secured between points 5 and 18 would be utterly destructive of the pump housing and pump. Further, the thermal contraction of the housing of the pump would aggravate those destructive forces. The invention allows for contraction of the pump housing and the vacuum-jacketed delivery line 12, 22 by providing an arrangement in which the contraction of the housing and line, accompanying cooling, imposes no stress, force or strain on either the pump housing or the line. At the same time, the desired vacuum-insulating quantities of the line are maintained.

The high pressures at which the liquid is delivered by the pump, 1500 pounds per square inch, for example, would, if permitted to exert unrelieved forces against any frontal surfaces of the line, such as wall 55 or the right hand surface of flange 15 (FIG. 2), push that line back against the pump housing and destroy it. The present invention provides an arrangement whereby such pressures are caused to exert readily dissipated forces against the fixed foundation 9, without exerting any substantial forces against the pump housing.

Referring now to FIGS. 2–4, pump 5 is provided with a flanged female input coupler 28 having an inner bore in registry with and rigidly secured to pipe 22. This coupler is referred to as the "first" mounting coupler. Under operating conditions liquid is delivered by the pump to pipe 22 at such temperatures as −420 degrees F., for example, and at such pressures as 1500 pounds per square inch. These conditions are mentioned as illustrative and not by way of limitation. Concentric with pipe 22 is an exterior vacuum-containing jacket 12, the space between the members 12 and 22 comprising a vacuum chamber 16, which insulates the liquid in pipe 22 against heat leak. Jacket 12 terminates in a cylindrical male input coupler 31, gas-tightly but slidably mounted within a complementary outer bore in female input coupler 28, the latter being rigidly secured to pump 5. That is to say, the first male input coupler 31 is complementary to the first mounting coupler 28 (FIG. 2). Female input coupler 28, the housing of pump 5, and the input end of pipe 22 are secured together. Coupler 31 has, formed on its outer surface, one or more annular grooves, such as that indicated at 32, in which are placed appropriate gas-tight seals such as plastic O-rings 29 and 30. Again, it will be understood that other sealing expedients such as gaskets can be employed.

Attention is particularly invited to the fact that male coupler 31 is gas-tightly but slidably mounted with respect to the input framework of members 5 and 28, so that any forces tending to move coupler 31 toward the pump housing are not transmitted to the housing. To allow for displacement of member 31 toward the pump housing, the structure is so designed that at room temperatures there is a gap 50 between male input coupler 31 and wall 51 of coupler 28.

The end of jacket 12 which is near to flange 18 terminates in a generally cylindrical male output coupler 34 (FIG. 2). Tubular jacket 12 and male output coupler 34 extend outwardly beyond the end of pipe 22. A continuum between the outer (right) end of male output coupler 34 and pipe 22 is provided by an annular flange 15, an extension 14, and an integral flange 52 formed on male output coupler 34. Extension 14 has an internal diameter approximating the external diameter of extension 19 and described hereinbelow. The external diameter of extension 14 is smaller than the internal diameter of jacket 12 and coupler 34, so that vacuum space 16 is extended to overlap extension 19 and vacuum space 7, presently to be described. Coupler 34 secures jacket 12 to one end of extension 14 and flange 15 secures the other end of extension 14 to pipe 22. The members 31, 12, 34, 14, 15 and 22 may be made of stainless steel, for example, and are suitably welded or otherwise secured together into a vacuum-tight structure (defining vacuum space 16). The first mounting coupler 28 preserves the vacuum while permitting displacement of the first complementary coupler 31.

Attention is now directed to the fact that thermal contraction of the pump housing and pipe 22 and extension 14 produces forces which are applied to the members 34, 12 and 31, simply to slidably displace the male coupler 31 within the female coupler 28, so that no force is exerted on the pump housing. Further, such contraction of the pump housing exerts no substantial force on the output end because extension 14 slidably fits over extension 19 and coupler 34 slidably fits into coupler 25. Coupler 25 is referred to as the "second mounting coupler" and coupler 34 is referred to as the "second complementary coupler."

The pipes 22 and 21 and the jacketing are so formed (FIG. 2) at the output end that the vacuum jacket 7 of the projecting or male joint member extends or telescopes into the vacuum jacket 16 of the female joint member, forming a liquid- and gas-tight joint. Specifically, the male element of this joint is so formed that pipe section 21 projects outwardly beyond the end of the vacuum-containing jacket or tube 17. A continuum between the ends of tube 17 and pipe 21 is provided by the flange 18, an extension 19 and an annular flange member 20. Extension 19 has an internal diameter larger than pipe 21 and extends vacuum space 7 to protect the projecting portion of pipe 21. Flange 18 secures one end of extension 19 to tube 17, being formed with concentric bores secured to those elements. Annular flange member 20 secures the other end of extension 19 to pipe 21. The members 17, 18, 19, 20 and 21 may be made of stainless steel, for example, and are suitably welded and secured into a unitary vacuum-tight structure (defining vacuum space 7).

For purposes of exposition, the gap between extensions 19 and 14 has been greatly exaggerated in FIG. 2. This gap may be closed by plastic material bonded to extension 19 in the manner disclosed and claimed in the co-pending patent application of Herrick L. Johnston and Gwynne A. Wright entitled "Joint for Transfer of Cryogenic Liquids and Method of Manufacture thereof," Serial No. 777,092, filed in the United States Patent Office on November 28, 1958, and assigned to the same assignee as the present application and invention. Said co-pending patent application is now abandoned. As has been pointed out, flange 18 is rigidly supported with relation to concrete foundation 9.

In order to permit sliding displacement of male output coupler 34 (caused by contraction of pipe 22 and extension 14) relative to flange 18, there is provided the female output coupler 25 which is formed with a face in flat abutment with flange 18 and a recess which slidably but gas-tightly receives the male output coupler 34. That is to say, the second mounting coupler 25 slidably receives the second complementary coupler 34. The end of this recess adjacent flange 18 is enlarged to receive an outwardly extending flange integrally formed on male coupler 34 and the parts are so designed that, when at room temperature, a gap 53 is left between the last-mentioned flange and the wall 54 of such enlargement.

The members 18 and 25 gas-tightly abut each other and suitable sealing means is provided, such as the O-ring 8, imbedded in an annular groove 36 formed on coupler 25.

Coupler 25 is internally grooved at 26 and 27 to receive O-ring seals such as that indicated at 35. Again, it will be understood that such sealing expedients are shown herein by way of illustration and not limitation.

Contraction of pipe 22 and extension 14 and resultant axial displacement of male output coupler 34 (to the left as shown in FIG. 2) imposes no strain on flange 18 because member 34 is slidable to a limited extent within female output coupler 25. The extent of the displacement here involved is equal to the sum of the amounts of thermal contraction of the pump housing and pipe 22 and extension 14, through the temperature span involved (i.e. atmospheric temperature down to the temperature of the liquid delivered by the pump). The parts are designed to establish the gaps 50 and 53 at room temperature. When the structure is cooled down at a low pressure to 20 to 35 pounds per square inch, for example, preparatory to normal pump operation the outer flange of male coupler 34 abuts against face 54 of the second mounting or output coupler 25 and male coupler 31 abuts against wall 51 of the first mounting or input coupler 28. Under this condition, high liquid pressures exerted against annular flange 15 (right hand face, FIG. 2) and face 55 of male output coupler 34, in a direction parallel to pipe 22 are taken up by wall 54 of female output coupler 25 and ultimately transmitted to foundation 9. The invention thus provides an arrangement whereby the required transfer of liquid is achieved with vacuum insulation and without imposing any stresses, due to thermal contraction or pressure, onto the pump housing, or other input equipment, all thermal stresses being relieved by reason of the slidable relationships between the first or input coupler members 31 and 28 and the second or output coupler members 34 and 25, and pressures being relieved by the abutment of the flange of coupler 34 against wall 54 of coupling 25 and ultimate dissipation of force through flange 18 and foundation 9.

The improvement provided by the invention is here contrasted with a prior art bellows type of arrangement which can be used at the lower pressures prevailing at the input end of the pump. As shown, the input feed to the pipe comprises a pair of input pipes 44 and 46, respectively, vacuum-jacketed by tubes 40 and 42, the jackets being terminated at one end by a flange 39 and an extension 38 and at the other end by a flange 43. Pipes 44 and 46 are joined by a flexible bellows 45 and tubes 40 and 42 are similarly joined by a flexible bellows 41, the bellows being susceptible to employment at the relatively low pressures involved at the pump input. The fact that bellows cannot be employed at the output end of the pump under pressure conditions on the order of those here involved was one of the factors which established need for the present invention. A bellows exerts a force on each of the two points between which it is placed.

In FIG. 5 there is shown an alternative output arrangement for the FIG. 2 system which differs from that shown in FIG. 2 in that the joint at the output end is reversed. In FIG. 5 the pipe 22 is extended to the right of flange 18', the vacuum chamber 7' overlaps chamber 16', extension 14' fits within extension 19', and the first transfer line section terminates at its output as a male joint member, not female, as in FIG. 2. The FIG. 5 output arrangement and the FIG. 2 input equipment (to the left of the break in jacket 12) comprise apparatus for transferring a cryogenic liquid from liquid-supply equipment 5 to a remote fixed location without imposing breaking strains on said equipment, comprising:

First and second double-walled transfer sections each having an inner liquid-transfer pipe 22, 21 and an outer jacket 12, 17, said sections defining vacuum chambers 16', 7', One of said sections being formed with an extension 19' having an enlarged interior bore and the other of said sections being formed with a complementary extension 14' having a reduced outer diameter, said extensions telescoping to form a joint, First and second mounting couplers (28 of FIG. 2, 25 of FIG. 5) rigidly secured to said equipment and to said fixed location, respectively, First and second complementary couplers (31 of FIG. 2, 34' of FIG. 5) secured to the outer jacket of the first transfer section and gas-tightly but slidably fitted to the first and second mounting couplers, The inner pipe 22 of the first transfer section being rigidly secured to said equipment at one end and the first complementary coupler (31 of FIG. 2) being axially displaceable relative to that inner pipe so that thermal contraction of said equipment (5 of FIG. 2) and said inner pipe 22 and its associated extension 14' axially displaces the complementary couplers (31 of FIG. 2, 34' of FIG. 5) relative to their respective mounting couplers 28, 25 but imposes no strain on the equipment, And a flange member 18' at said fixed location formed to secure together the jacket 17 and extension 19' of the second transfer section and to abut against the second mounting coupler 25, Said second mounting 25 and second complementary couplers 34' being formed with surfaces which engage to prevent further displacement of the second complementary coupler 34' after a predetermined amount of contraction has occurred, Whereby axial forces caused by pressures and directed toward said equipment (as at 15' and 55') are neutralized by pickup at said surfaces and dissipation at said fixed location (through 25, 18' and 9). Again, the gap between elements 14' and 19' is exaggerated. The members closely fit in practice.

An inner metallic ring 60 may optionally be provided between pipes 21 and 22 (FIG. 5) to prevent turbulence.

The elements of FIG. 5 corresponding to FIG. 2 elements bear the same reference numerals primed. Identical elements bear the same reference numerals.

Returning now to a consideration of FIG. 2, the invention provides a particularly useful substantially zero load input connection, to-wit:

In the transfer of cryogenic liquids, the combination of inner transfer piping 22, 15, 14, outer vacuum-confining jacketing 31, 12, 34 free relative to the piping at one end (i.e. input) and closed with the piping at the other end (i.e. output), and means comprising a mounting coupler 28 which the jacketing slidably fits (per 31) at said one end for closing the vacuum-tight chamber 16 between the jacketing and piping while permitting thermal contraction of the piping 22, 15, 14. The mounting coupler here shown is a female fitting 28, and the jacketing terminates at the input end in a complementary male coupler 31. The output end of the jacketing terminates in the second complementary male coupler 34 and the second female coupler 25 is provided to slidably receive said second complementary male coupler 34. The second mounting coupler 25 and second complementary coupler 34 are provided with engagement surfaces (as 54) for limiting displacement of the second male coupler 34. The piping and second male coupler 34 are closed by an extension 14, and a second vacuum-jacketed transfer line 21, 17 has a complementary extension 19 slidably fitted to the first-mentioned extension to form a joint. The second line members 19 and 17 are secured to the fixed location 18. Therefore it will be seen that in FIG. 2 the male joint members are secured to 18. In FIG. 5 the female joint members are secured to 18'.

While there has been shown and described what is considered to be the preferred embodiment of the invention, it will be understood by those skilled in the art that various modifications and changes may be made therein without departing from the proper scope of the invention as defined by the appended claims.

We claim:

1. Apparatus for transferring a cryogenic liquid from liquid-supply equipment to a remote fixed location without imposing breaking strains on said equipment, comprising:

first and second double-walled transfer sections each having a rigid inner liquid-transfer pipe and a rigid outer jacket, said sections defining vacuum chambers, the first one of said sections being formed with an extension having an enlarged interior bore and the second of said sections being formed with a complementary extension having a reduced outer diameter, said extensions telescoping to form a joint, first and second mounting couplers rigidly secured to said equipment and to said fixed location, respectively, first and second complementary couplers secured to the outer jacket of the first transfer section and gas-tightly but slidably and non-rigidly fitted to the first and second mounting couplers, respectively, said first and second complementary couplers and the inner pipe and outer jacket of the first transfer section defining a vacuum space, the inner pipe of the first transfer section being rigidly secured to said equipment at one end and the first complementary coupler being axially displaceable relative to that inner pipe so that thermal contraction of said equipment and said inner pipe and its associated extension axially displaces the complementary couplers relative to their respective mounting couplers and inserts the first complementary coupler further into the first mounting coupler, but imposes no strain on the equipment, and a flange member at said fixed location formed to secure together the jacket and extension of the second transfer section and to abut against the second mounting coupler, said second mounting and second complementary couplers being formed with surfaces which engage to prevent further displacement of the second complementary coupler after a predetermined amount of contraction of the pipe of the first transfer section has occurred, whereby axial forces caused by pressures and directed toward said equipment are neutralized by pickup at said surfaces and dissipation at said fixed location.

2. A device for transferring cryogenic liquids without imposing stresses on its input and comprising a first female coupler at the input end, a second female coupler at the output end, first and second male couplers at the input and output ends, said female couplers being formed with recesses receiving the other couplers, a rigid exterior metallic jacket extending between and secured to said male couplers, a first rigid delivery pipe freely projecting through said first male coupler and formed with an enlarged diameter extension secured to the second male coupler whereby thermal contraction of said pipe and extension slidably displaces said second male coupler and jacket and first male coupler without imposing stresses on the input point, said pipe and extension and jacket and male couplers defining a first transfer section having a vacuum-tight chamber closed by the first female coupler, a second transfer line having a reduced vacuum-confining portion slidably extending into the first-mentioned extension and forming therewith a joint, a flange rigidly fixed in space and secured to the second transfer line, said flange abutting against the second female coupler and constituting a fixed output point, and said second male and female coupler members being formed with surfaces which are spaced prior to thermal contraction but which abut after thermal contraction to pick up and dissipate at the output point pressures exerting force toward the input end of the structure.

3. In a device for the transfer of cryogenic liquids, the combination of:

apparatus to be relieved of strain;

a rigid inner transfer piping secured at one end to said apparatus, rigid outer vacuum-confining jacketing free relative to the piping at said one end, first and second male couplers for terminating the ends of said jacketing, a first mounting coupler secured to said apparatus, said second male coupler being closed to said piping at the end remote from said apparatus, said first male coupler slidably fitting said first mounting coupler and being inserted further thereunto as the piping contracts, said first mounting coupler and first male coupler closing the vacuum chamber between the jacketing and the piping while permitting thermal contraction of the piping, and a second mounting coupler fixed in space and slidably receiving said second male coupler, the length of the last-mentioned pair of couplers and the extent of their telescoping being sufficient to preserve their sliding engagement throughout the range of contraction of said pipe.

4. The combination in accordance with claim 3 in which the second mounting coupler and second male coupler are provided with engagement surfaces which abut to limit displacement of the second male coupler as the piping contracts.

5. The combination in accordance with claim 4 in which the piping and second male coupler are closed by an extension, and a vacuum-jacketed transfer line having a complementary extension slidably fitted to the first-mentioned extension to form a joint.

6. Apparatus for transferring a cryogenic liquid from liquid-supply equipment to a remote fixed location without imposing breaking strains on said equipment, comprising:

first and second double-walled transfer sections each having a rigid inner liquid-transfer pipe and a rigid outer jacket, said sections defining vacuum chambers, the first of said sections being formed with an extension having an enlarged interior bore and the second of said sections being formed with a complementary extension having a reduced outer diameter, said extensions telescoping to form a joint, first and second mounting couplers rigidly secured to said equipment and to said fixed location, respectively, first and second complementary couplers secured to the outer jacket of one of said transfer sections and gastightly but slidably and non-rigidly fitted to the first and second mounting couplers, respectively, said first and second couplers and the inner pipe and outer jacket of said one transfer section defining a vacuum space, the inner pipe of said one transfer section being rigidly secured to said equipment at one end and the first complementary coupler being axially displaceable relative to that inner pipe so that thermal contraction of said equipment and said inner pipe and its associated extension axially displaces the complementary couplers relative to their respective mounting couplers and inserts the first complementary coupler further into the first mounting coupler but imposes no strain on the equipment, and a flange member at said fixed location formed to secure together the jacket and extension of the other transfer section and to abut against the second mounting coupler, said second mounting and second complementary couplers being formed with surfaces which clear at room temperature but engage to prevent further displacement of the second complementary coupler after a predetermined amount of contraction of the pipe of said one transfer section has occurred, whereby axial forces caused by pressures and directed toward said equipment are neutralized by pickup at said surfaces and dissipation at said fixed location.

References Cited in the file of this patent

UNITED STATES PATENTS

| | | |
|---|---|---|
| 323,834 | Turner | Aug. 4, 1885 |
| 1,288,631 | McFarland | Dec. 24, 1918 |
| 1,292,060 | Richards | Jan. 21, 1919 |
| 1,332,836 | Heyerdahl | Mar. 2, 1920 |
| 1,495,066 | Browne | May 20, 1924 |
| 1,786,506 | Ray | Dec. 30, 1930 |
| 2,438,312 | Bunn | Mar. 23, 1948 |
| 2,737,685 | Fitley | Mar. 13, 1956 |
| 2,785,536 | Hinckley | Mar. 19, 1957 |
| 2,850,264 | Grable | Sept. 2, 1958 |